C. HALL.
BAKING PAN.
APPLICATION FILED NOV. 19, 1910.
994,832.
Patented June 13, 1911.
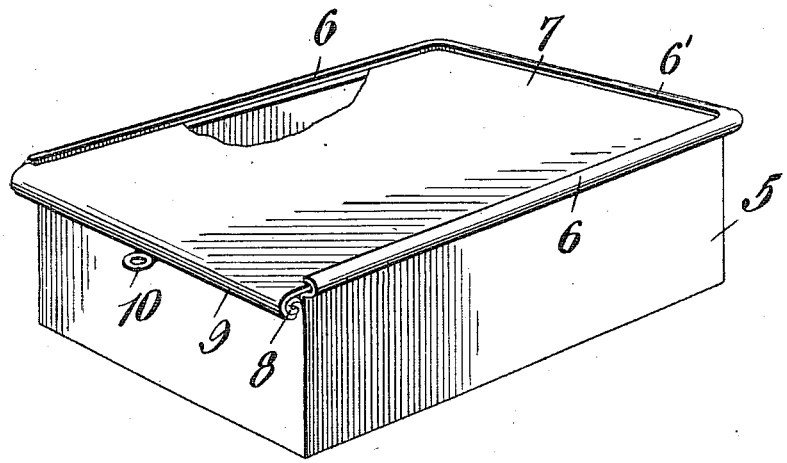
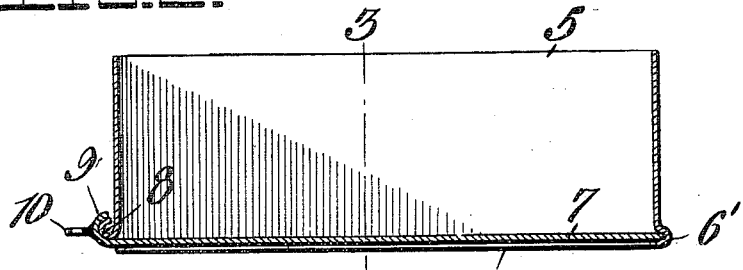
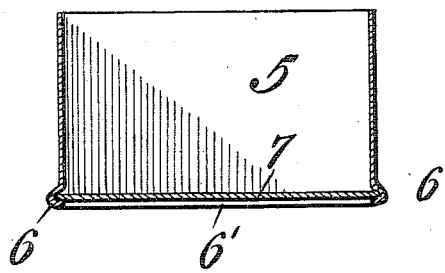
Witnesses
Chas. L. Griesbauer.
M. F. Peller.
Inventor
C. Hall,
By Watson E. Coleman.
Attorney

UNITED STATES PATENT OFFICE.

CARRIE HALL, OF NORTH STREET, MICHIGAN.

BAKING-PAN.

994,832. Specification of Letters Patent. Patented June 13, 1911.

Application filed November 19, 1910. Serial No. 593,259.

*To all whom it may concern:*

Be it known that I, CARRIE HALL, a citizen of the United States, residing at North Street, in the county of St. Clair and State of Michigan, have invented certain new and useful Improvements in Baking-Pans, of which the following is a specification, reference being had to the accompanying drawings.

This invention relates to improvements in baking pans and more particularly to a cake pan and has for its object to provide means for removing the cake from the pan without breaking the same.

Another object of the invention resides in the provision of a baking pan having a slidable bottom plate and means for arranging the same upon the walls of the body of the pan.

A further object resides in the provision of a very simple and efficient device of the above character comprising a sliding bottom plate arranged in the grooved edges of the walls of the pan, one of the end walls of said pan being outwardly bent at its edge for engagement with a similarly bent end of the sliding bottom plate to hold said plate in position.

With these and other objects in view, the invention consists of the novel features of construction combination and arrangement of parts hereinafter fully described and claimed, and illustrated in the accompanying drawings, in which—

Figure 1 is an inverted perspective view of a pan constructed in accordance with my invention, the sliding bottom plate being partially broken away; Fig. 2 is a longitudinal section; and Fig. 3 is a transverse section taken on the line 3—3 of Fig. 2.

Referring more particularly to the drawing 5 indicates a rectangular baking pan such as is used for baking cakes, pies or other pastry. This pan is of substantially rectangular form and the side walls thereof are bent to form substantially semi-circular longitudinal guides 6. One of the end walls of the pan body is similarly bent as at 6′ and forms a continuation of the longitudinal guides 6. These bent edges of the side walls and the end wall also greatly strengthen the pan body and provide a substantial support therefor. It will be observed from reference to Figs. 2 and 3 that the edges of these bent portions of the pan body are disposed in the same plane as the inner surfaces of the side and end walls so that they will not interfere with the free movement of the cake therefrom when the bottom of the pan is removed as will now be described.

The bottom plate 7 has its side and one of its end edges engaged in the grooves formed by the curved edges of the body walls, when the same is in position to receive the cake before being placed in the oven. The end wall of the body opposite to the curved edge 6′, is also curved at its lower edge but outwardly as indicated at 8 in an opposite direction to the curved edge 6′ and above the longitudinal guide edges 6 of the side walls. The pan is shown in inverted position in Fig. 1 to clearly disclose this construction. This curved or beaded edge 8 of the end wall is adapted to be engaged by the curved or bent end 9 of the bottom plate 7 to limit the inward movement of the plate between the guides 6 and retain the same in its proper position. To this end of the plate a ring 10 is centrally attached by means of which the bottom plate 7 may be withdrawn.

In the use of the device, after the cake has been baked and the pan removed from the oven, it is placed upon a plate and the bottom plate 7 of the pan drawn from beneath the walls thereof. After removing the plate and then lifting the pan body, the weight of the cake will cause the same to drop or fall between the walls upon the plate in which it is desired to deposit the same, and without breaking the same or in any way marring its appearance as is commonly done in the use of the ordinary baking pan.

From the foregoing it is believed that the great convenience and utility of the device will be apparent. It is preferably constructed of sheet iron and is strong and durable in construction while at the same time it may be manufactured at but slightly greater cost than the ordinary baking pan. The rapidity with which the cake may be removed from the pan is also an important result of the construction of my device. As before stated the general construction of the pan is also materially improved and rendered more substantial.

Having thus described the invention what is claimed is:—

A device of the character described comprising a rectangular pan body, the side walls and one of the end walls of said body being bent outwardly at their lower edges to form substantially semi-circular guide grooves and strengthening flanges for said walls, the free edges of said bent portions of the body walls being disposed in the same plane as the inner surfaces of said walls, the other end wall of the body having its lower edge outwardly bent above the longitudinal grooves, and a removable bottom plate slidably mounted in said guides and adapted to engage at one end in the curved edge of the first named end wall, the other end of said plate being bent to engage upon the curved lower edge of the last mentioned end wall.

In testimony whereof I hereunto affix my signature in the presence of two witnesses.

CARRIE HALL.

Witnesses:
W. H. AITKIN,
ANNIE CAMPBELL.

Copies of this patent may be obtained for five cents each, by addressing the "Commissioner of Patents, Washington, D. C."